United States Patent [19]

Ueno et al.

[11] 4,205,414
[45] Jun. 3, 1980

[54] MEAT TENDERIZER

[75] Inventors: Saburo Ueno; Koji Satomi; Akio Sasaki, all of Ichigayadaimachi, Japan

[73] Assignee: Kureha Kagaku Kogyo Kabushiki Kaisha, Nohonbashi, Japan

[21] Appl. No.: 906,171

[22] Filed: May 15, 1978

[30] Foreign Application Priority Data

| May 17, 1977 | [JP] | Japan | 52-55928 |
| May 17, 1977 | [JP] | Japan | 52-55929 |
| May 17, 1977 | [JP] | Japan | 52-62072[U] |

[51] Int. Cl.² ............................................. A22C 9/00
[52] U.S. Cl. ..................................................... 17/25
[58] Field of Search ................................ 17/25, 30, 31

[56] References Cited

U.S. PATENT DOCUMENTS

| 567,471 | 9/1896 | Hasenritter | 17/31 |
| 2,061,799 | 11/1936 | Hintz | 17/25 |
| 2,841,818 | 7/1958 | Griffith | 17/25 |
| 3,727,267 | 4/1973 | Clark | 17/25 |

Primary Examiner—Willie G. Abercrombie
Attorney, Agent, or Firm—Sughrue, Rothwell, Mion, Zinn and Macpeak

[57] ABSTRACT

A reciprocating type tenderizer is driven by a rotary crank to enable higher operating speeds and much higher cutting edge velocities. The surface of the conveyor is maintained within 1–2 mm of the bottom dead center position of the cutting edges to provide more complete penetration and a torque limiter is provided for interrupting the conveyor movement during cutting. Novel cutting edge configurations are also provided which are suitable for a wide variety of meats.

7 Claims, 10 Drawing Figures

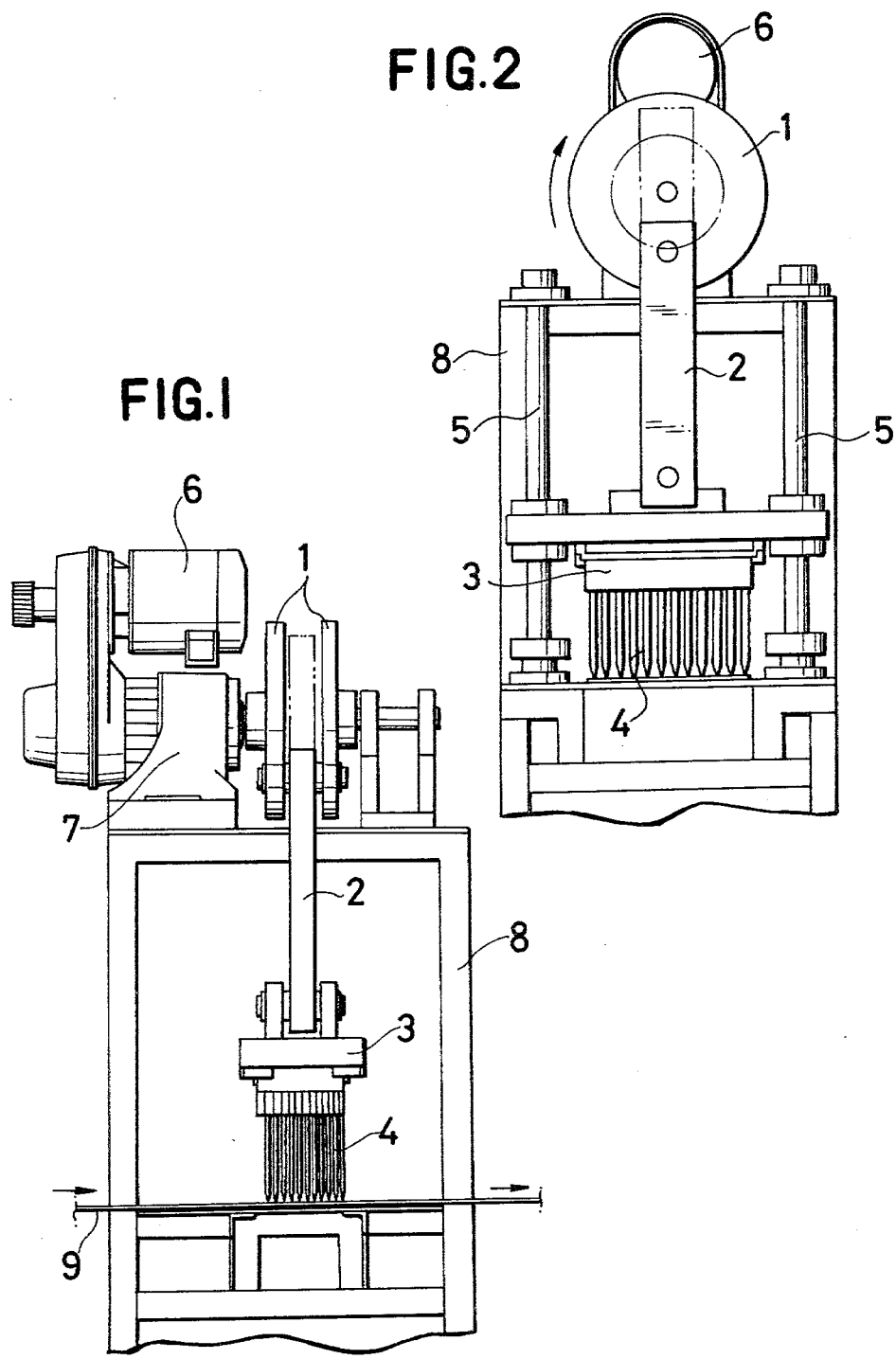

MEAT TENDERIZER

BACKGROUND OF THE INVENTION

This invention relates to the construction of a meat tenderizer, and more particularly to the cutting edges and driving machinery therefor.

The muscle tissue of the meat is often covered with a muscle membrane, and at its end portion is a tendon. One process of treating meat material when processing meat is referred to as a muscle removing process in which the muscle membrane and the tendon are removed; however, it is difficult to completely remove them. In the part of the meat covered with muscle membrane, it is difficult to allow a salting agent to penetrate thereinto in the salting process, which is liable to result in poor waterholding and poor coloring. Furthermore, the muscle membrane and the tendon are shrunk greatly when heated, as a result of which the water contained therein is oozed out to deteriorate the quality of the product. These drawbacks can be considerably eliminated by employing the process of tenderizing in cutting meat.

In manufacturing meat products such as sirloin ham, boneless ham and pressed ham, the meat is sometimes subjected to a process of "tenderizing" in order to make the quality of products uniform and to increase the yield. In this process, a mass of meat is broken down or the muscles in the meat are cut with suitable edges, to thereby increase the surface area of the meat. Increasing the surface are of the meat means that the area of the meat brought into contact with a salting agent and various seasonings in the salting process, and in the processes before and after salting, is increased. Accordingly, the salting process can be uniformly accomplished in a very short time.

In most of the tenderizers employed in the meat processing industries, in general, a head with several tens of edges embedded in a metal plate is moved vertically (up and down), while a mass of meat to be processed is intermittently moved on a belt conveyor, pausing beneath the vertically-moving edges to be processed.

In a conventional mechanized tenderizer, the vertical movement of the head is, in general, carried out by a hydraulic cylinder; that is, the head is driven by hydraulic pressure. Therefore, the time required to move the head up and down is relatively long, and accordingly, the meat processing efficiency per unitary time is low. It is very difficult to achieve an operating speed in excess of 30 strokes per minute. In addition, it is rather difficult to hold a mass of meat while breaking it down with the tenderizer. Furthermore, the travelling speed of the cutting edges is relatively low, thus making it extremely difficult to satisfactorily cut and penetrate mutton or pork covered with thick muscles. Thus, the conventional tenderizer is unsatisfactory in these respects.

Conventional vertically-moving tenderizers are also disadvantageous in the following points: The distance between the edge assembly in its downward position and the bottom of the meat is no more than 10 mm; that is, it is impossible for the edge assembly to sufficiently stick the meat. In order to increase the meat tenderizing effect as much as possible, it is important to allow the tips of the edge assembly to stick into the meat deeply and positively. Furthermore, with a view to employing the tenderizer as an industrial machine, it is desirable that it can be smoothly operated and it has a great treating capability per unitary time. Thus, although shutting down the conveyor is an acceptable technique for stopping the meat beneath the cutting edges in a tenderizer having a low operating speed of 30 strokes per minute, it would be unsatisfactory at higher speeds and, in any event, is hard on the machinery.

Furthermore, the configuration and construction of the edges of the tenderizer should suitably match the properties of the meat material. Mutton, pork and horse meat are mainly employed as meat material to be processed into meat products; however, they are greatly different from one another in nature or property. Accordingly, it is necessary to provide edges different in configuration and construction for different kinds of meat. If the configuration and construction of the edges are not suitable, the desired result cannot be obtained, and a counter result may be obtained, e.g., sometimes visible cuts remain on the meat product.

SUMMARY OF THE INVENTION

It is, therefore, an object of this invention to provide a meat tenderizer which may be operated smoothly at those speeds.

It is a further object of this invention to provide a tenderizer which penetrates the meat more deeply in order to enhance the meat tenderization.

It is a still further object of this invention to provide cutting edges for the tenderizer which are suitable for the different types of meat to be processed.

These and other objects are achieved by providing a tenderizer in which vertical movement of the cutting edges is provided by a rotating flywheel crank so that operating speeds of at least 120 strokes per minute may be achieved and cutting speeds in excess of 100 cm/sec are available to cut into very tough meat. The distance between the cutting edges in their downward position and the conveyor surface is preferably set at 1-2 mm to provide deep penetration at the meat and a highspeed, low-friction conveyor is provided with a torque limiter which stops driving the conveyor only on the downward stroke of the cutter so that the pause is very short and the entire conveyor drive need not be shut down.

Cutting edges are provided which are suitable for the various meats to be processed so that changing of the cutting edges is required less frequently. As a result of the studies and experiments made by the present inventors on a variety of meat for manufacturing meat products, the inventors have provided two edge members, one is for a tenderizer which processes a relatively large mass of meat to make meat products such as boneless ham and sirloin ham which are referred to as "a single taste product" of pork, and the other is for a tenderizer which processes a relatively small mass of meat such as pork, mutton and horse meat to make meat products such as, for instance, pressed ham.

BRIEF DESCRIPTION OF THE DRAWINGS

The preferred embodiment of this invention will now be described with reference to the accompanying drawings, in which:

FIG. 1 is a partial front view of a high speed tenderizer according to a first embodiment of the present invention including the edge drive mechanism;

FIG. 2 is a side view of tenderizer in FIG. 1;

DETAILED DESCRIPTION OF THE INVENTION

Figure 3:
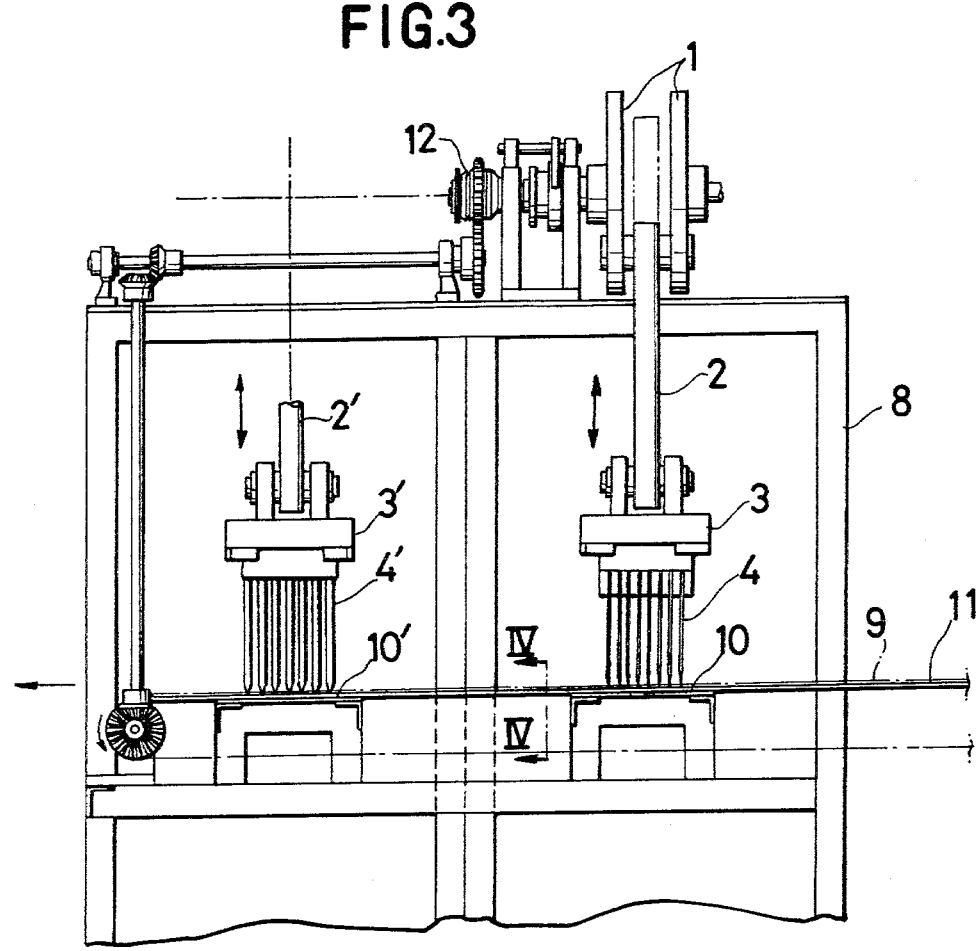
FIG. 3 is a partial front view of the tenderizer according to a second embodiment of the present invention including the conveyor drive mechanism.

FIG. 1 is a partial front view of a high-speed tenderizer according to a first embodiment of the invention, while the FIG. 2 is a side view of the same. Referring to FIGS. 1 and 2, reference numeral 1 designates a large flywheel and crank, reference numeral 2 a connecting rod, 3 a head in which a number of edges are embedded, 4 a number of edges, 5 guide rods, 6 an electric motor, 7 a reduction gear, and 8 a frame. As shown in FIG. 2, the large flywheel and crank 1, the connecting rod 2 and the head 3 having a number of edges 4 are mounted on the frame 8 through the guide rods 5. The tenderizer according to the invention is driven by the motor 6 through the reduction gear 7. A conveyor belt is allowed to run along a rigid stand and below the edges 4.

The tenderizer's edges directly coupled to the crank secured to the flywheel are moved vertically as the flywheel makes circular motions at constant speed, and the speed of the edges is of a sinusoidally varying speed motion in which it is zero at the top dead center of the crank, a maximum at a position of 90 degrees, and zero at the bottom dead center again. This is suitable for breaking down the meat with the edges.

Under the conditions that the crank operating radius is 10 cm (the edge's vertical movement stroke being 10 cm×2=20 cm) and the crank angle is 90 degrees from the top dead center, the momentary speed of the edges (hereinafter referred to as an edge assembly, when applicable) for the crank revolution speeds 90 rpm and 120 rpm can be calculated as follows:

With a crank revolution speed of 90 rpm, the speed of the edge assembly=$(2\pi \times 10$ cm $\times 90)/60 = 94.8$ cm/sec.

With a crank revolution speed of 120 rpm, the speed of the edge assembly=$(2\pi \times 10$ cm $\times 120)/60 = 126.4$ cm/sec.

The momentary speed of the edge assembly obtained when the crank is at a position 5 cm from the bottom dead center can be calculated as follows:

With the crank revolution speed 90 rpm, the speed of the edge assembly=$94.8 \times 8.66/10 = 82.0$ cm/sec.

With the crank revolution speed 120 rpm, the speed of the edge assembly=$126.4 \times 8.66/10 = 109.4$ cm/sec.

Thus, when the thickness of meat to be penerated is 10 cm and the crank revolution speed is 90 rpm, the edge assembly is stuck into the meat at a high speed of 94.8 cm/sec and, therefore, the edge assembly can easily penerate into the meat while holding the meat steadily. When the edge assembly is moved down to 5 cm from the bottom dead center, the speed of the edge assembly reaches 82.0 cm/sec. When the edge assembly is further moved down to the bottom dead center, the speed thereof becomes zero. Since this time interval of fast decreasing speed is as shore as $60 \text{ sec}/90 \times \frac{1}{4} = 1/6$ sec, the edge assembly sharply cuts meat even if it contains strong muscles or the like.

Similarly as in the above-described case, with a crank revolution speed of 120 rpm, the speed of the edge assembly is 126.4 cm/sec when it is stuck into a mass of meat. When the edge assembly is 5 cm from the bottom dead center, the speed thereof is 109.4 cm/sec. When the edge assembly is at the bottom dead center, the speed thereof is zero. This time interval is reduced to $60 \text{ sec}/120 \times \frac{1}{4} = \frac{1}{8}$ sec, and its performance of cutting meat is considerably improved.

On the other hand, with a conventional hydraulic pressure or pneumatic pressure type tenderizer having, for instance, a stroke of 20 cm and 30 strokes per minute (it being difficult to increase the speed above this), the speed of the edge assembly is merely $(20 \text{ cm} \times 30 \times 2)/60 = 20$ cm/sec and, therefore, it is very difficult to sharply cut mutton, pork covered with thick muscles or the like.

Figure 4:
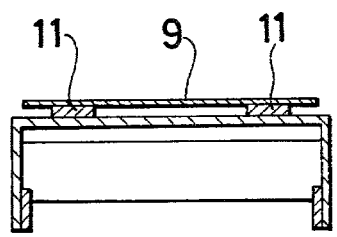
FIG. 4 is a sectional view along line IV—IV in FIG. 3.

FIGS. 3 and 4 illustrated a second embodiment of the present invention which will now be described. The distance between the edges 4 (4') of the tenderizer at bottom dead center and the upper surface of a conveyor 9 adapted to convey meat at a constant speed is set to 1–2 mm. A metal plate 10 (10') which is flat and rigid is provided under the conveyor belt and at a position immediately below the edges so that the conveyor belt is not bent downward and the meat is positively held during penetration. The aforementioned distance between the edges and the upper surface of the conveyor belt is minimized so that the edges can penetrate the meat as deeply as possible. Since the rigid metal plate is placed under the conveyor belt so that the conveyor belt is not bent downward by the force sticking the edges into the meat, the distance between the upper surface of the conveyor belt and the edges will not increase due to bending of the conveyor. Reference numeral 11 designates metal or plastic plate rails about 20 mm wide and about 5 mm thick, which are provided on conveyor stands which are disposed in such a manner that they together with the aforementioned metal plates occupy the lower surface of the conveyor belt and the conveyor belt is moved along the conveyor stands and the metal plates. The rails 11 are intended to minimize the friction which may otherwise be caused between the conveyor belt and the conveyor stands. Accordingly, at least two rails 11 are provided longitudinally of the conveyor depending on the width of the conveyor belt. By virtue of the construction described above, the frictional resistance between the lower surface of the conveyor belt and the conveyor stands on which the conveyor belt is moved is reduced to one-tenth or less of that in the conventional tenderizer, and the conveyor belt can be smoothly moved at high speed.

Furthermore, in the tenderizer according to this embodiment, at the instant in time when the edges are caused to stick into the meat to apply the maximum load to the conveyor, a torque limiter 12 provided driving the conveyor is operated to stop running the conveyor. Thus, the application of a force to the edges which may bend the edges in the conveyor belt running direction is prevented. At the time instant when the edges start moving upward, the conveyor is driven by the torque limiter again. The flywheel 1 is driven from the right side by an electric motor (not shown) and is coupled to the torque limiter 12 through a clutch 15, although it would, of course, be possible to place the motor between the torque limiter and flywheel in place of or in addition to the clutch.

Figure 5A:
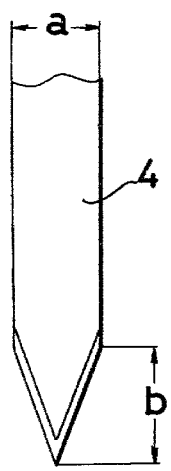
FIGS. 5(a) and 5(b) are front and side views, respectively, of a cutting edge for processing a relatively large mass of meat.
Figure 5B:
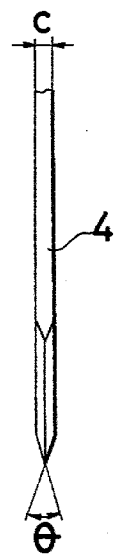

Now the novel cutting edges will be described with reference to FIGS. 5–8. An edge member of a tenderizer for processing a relatively large mass of meat is as shown in FIGS. 5(a) and 5(b). The edge member has a body portion whose section is rectangular, and an end portion where a triangle knife edge is formed. In the rectangular section, the long sides are 10–20 mm, and the short sides are 2–4 mm. The knife edge's angle is 20–60 degrees. The length b of the end portion is preferably 5–20 mm. If, in the case of meat to be processed into a single taste product, it is cut excessively or deeply, then the meat will break into pieces in a salting process using a tumbler. As a result, the loss of meat as a raw material is increased and, furthermore, visually recognizable cuts remain on the meat product. This is the reason for the above-described dimensional limitations on the configuration of the edge member.

Figure 6A:
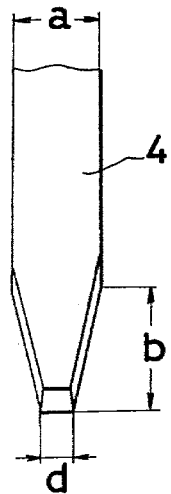
FIGS. 6(a) and 6(b) are front and side views, respectively, of a cutting edge for processing a relatively small mass of meat.
Figure 6B:
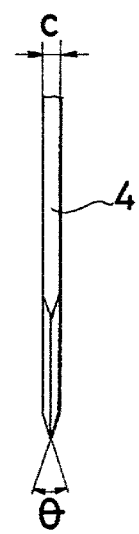

The configuration of an edge member of a tenderizer for processing a relatively small mass of meat is as shown in FIGS. 6(a)–6(b). This edge member has a body portion whose section is rectangular, and an end portion where a trapezoid knife edge is formed. In the rectangular section, the long sides are 10–20 mm, and the short sides are 2–4 mm. In the trapezoid knife edge, the length of the end portion is 5–20 mm, the upper case is 3–10 mm, and the knife edge's angle is 20–60 degrees.

Thus, two edge members different in configuration are provided for the tenderizer in view of the properties of a variety of meats to be processed. In general, mutton and horse meat are harder than pork because the former have more muscles and tendons than the latter. Accordingly, in the case of manufacturing pressed ham whose essential raw materials are mutton and horse meat, it is necessary to sufficiently cut the muscles and to increase the surface area of the meat thereby to allow the meat to uniformly contain a lot of water, seasoning, salting agent, etc. Otherwise, it is difficult to provide good meat products. Thus, it is desirable to form as many cuts as possible with the tenderizer. In this connection, it goes without saying that the meat should not be cut to the extent that the meat is cut into pieces, because cutting the meat into pieces results in a reduction in the size of the meat, which may decrease the commercial value of products. The above-described configurations of the edge members are so designed as to meet these requirements.

In practice, the tenderizer employs an assembly of these edge members; and the effect, of course, depends on the combination and arrangement of the edge members. Therefore, the combination and arrangement of the edge members will be described with reference to FIG. 7. In the assembly of edge members shown in FIG. 7, a number of edge members are embedded in a substrate (not shown) in such a manner that their long sides and short sides are in parallel to one another, respectively, in the form of a so-called needle mountain. The distances (A) and (B) between two adjacent edge members are 7–15 mm in a direction of the long side and 7–20 mm in a direction of the short side. The number of edge members is not particularly limited; however, in most of the assemblies, the edge members are arranged ten in the direction of the long side and fifteen in the direction of the short side.

Figure 7:
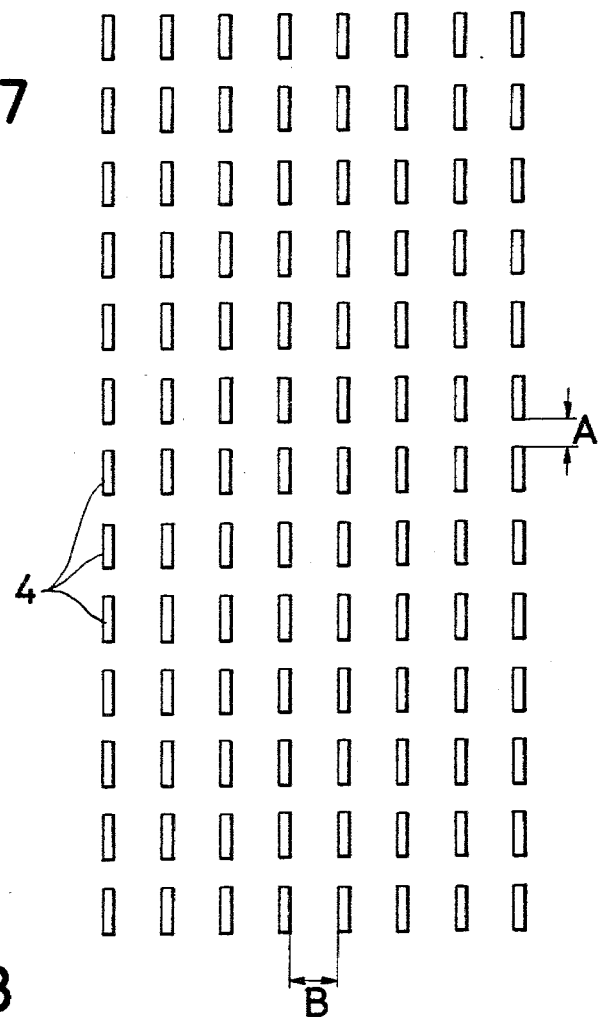
FIG. 7 is a plan view showing the arrangement of the cutting edges on the tenderizer.
Figure 8:
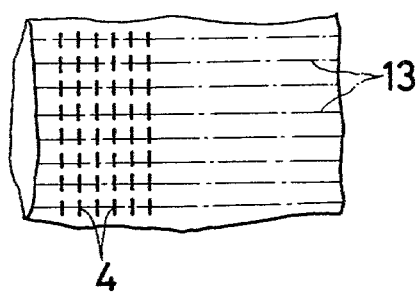
FIG. 8 is a diagram showing the relation between the orientations of the cutting edges and muscle fibers.

The edge member assembly as shown in FIG. 7 is mounted on the machine. While the edge member assembly is moved up and down, a mass of meat to be processed is conveyed below the edge member assemlby by means of a conveyor or the like, to thereby cut the mass of meat as described above. In this operation, the relationship between the direction of the edge members 4 and the direction of the muscle fibers 13 is as shown in FIG. 8. In the embodiment illustrated in FIG. 3, the two sets of blades 4 and 4' are arranged perpendicular to one another to provide effective tenderizing without the necessity of aligning each piece of meat.

A mass of meat processed with the edge member assembly of the tenderizer shaped and arranged as described above could absorb a general salting agent in a mixing operation time of 25 minutes, but a mass of meat not processed could not completely absorb it even in 40 minutes. In addition, comparison of boiled meat products was conducted. In the case of a mass of meat not processed, after the product thereof was cut it was found that water oozed out of the portion of the meat surrounded by the muscle membrane, and in a mass of meat containing tendons, the tendons were shrunk. On the other hand, in the case of a mass of meat processed according to the present invention, no such phenomena were found. In addition, the meat products were preserved in a refrigerator and the product of non-processed meat exhibited liquid between the ham surface and the casing while the product of processed meat caused no such phenomenon.

Furthermore, as is apparent from the above description, with the tenderizer according to this invention which employs the large flywheel coupled to the crank, the speed in vertical movement of the edge assembly can be increased, by virtue of its mechanism, by at least three or four times that of the conventional hydraulic pressure or pneumatic pressure type tenderizer, and the speed of the edge assembly at the instant it sticks into a mass of meat can be increased by at least five or six times that of the conventional tenderizer. Accordingly, mutton, pork having a number of muscles and beef can be readily broken down although it has been difficult to break them down in the past. Thus, the meat treating efficiency can be increased to three or four times that of the conventional tenderizer or more.

Still further, conventional mechines of this type have employed a method in which when the edges of the tenderizer stick into the meat, the conveyor is temporarily stopped in its entirety, that it, the conveyor is intermittently driven. On the other hand, this embodiment the torque limiter is coupled to the driving shaft, and therefore the conveyor is stopped only for a moment; that is, the conveyor is substantially continuously operated. Thus, the efficiency of the machine according to the invention is still further increased with respect to conventional machines, which results in a considerable advantage in treating meat as a raw material.

We claim:

1. A meat tenderizer of the type having a vertically movable edge assembly means having thereon a plurality of downwardly disposed cutting edges and a conveyor for supporting a mass of meat to be tenderized beneath said cutting edges, said tenderizer further comprising:
   a flat rigid plate fixedly provided beneath said conveyor in the path of said edge assembly means;
   a plurality of rail members contacting the underside of said conveyor and providing a low-friction support therefor;
   driving means for driving said conveyor to carry said mass of meat over said flat rigid plate; and drive limiting means for limiting the amount of driving force supplied from said driving means to said conveyor so that said conveyor will pause when the drag exerted on said conveyor by the downward pressing of said edges into said mass of meat exceeds a predetermined threshold value.

2. A meat tenderizer according to claim 1, wherein said first cutting edge assembly comprises a plurality of edge members each having a body portion of rectangular cross-section and a tapered end portion on which a knife edge is formed, the long side of said rectangular cross-section being approximately 10 to 20 mm, the short side of said rectangular cross-section being approximately 2 to 4 mm and the angle of said knife edge being approximately 20 to 60 degrees; said edge members being mounted on a substrate in parallel to one another and having a distance between the short sides of adjacent members of approximately 7 to 15 mm and a distance between long sides of adjacent members of approximately 7 to 20 mm.

3. A meat tenderizer according to claim 2, wherein the end portion forms a triangle having a base equal to the length of said long side and an altitude of approximately 5 to 20 mm.

4. A meat tenderizer according to claim 2, wherein said end portion forms a trapezoid having a lower base length equal to the length of said long side, an upper base of approximately 3 to 10 mm and an altitude of approximately 5 to 20 mm.

5. A meat tenderizer as defined in claim 1 wherein said movable edge assembly means comprises a head and a plurality of blades disposed on said head to form a first cutting edge assembly, said meat tenderizer further comprising:
   a rotatable member mounted for rotation about an axis and having thereon a drive element radially displaced from said axis;
   a connecting rod connected at one end to said head and at its other end to said drive element so that rotation of said rotatable element results in vertical reciprocating movement of said head; and
   means for rotating said rotatable member to thereby cause said head to vertically reciprocate between top dead center and bottom dead center positions, said blades at said bottom dead center position substantially penetrating said meat.

6. A meat tenderizer as defined in claim 1, wherein said vertically movable edge assembly means comprises a first cutting edge assembly having thereon a plurality of downwardly disposed cutting edges and a second cutting edge assembly having thereon a plurality of downwardly disposed cutting edges, the cutting edges in said second assembly being disposed in a different direction than the cutting edges in said first cutting edge assembly.

7. The meat tenderizer as defined in claim 6, wherein said cutting edges in said second cutting edge assembly are arranged at an angle of approximately 90 degrees with respect to the cutting edges in said first cutting edge assembly.

* * * * *